Feb. 15, 1949.  M. N. YARDENY  2,462,033
CONTROL APPARATUS WITH FLEXIBLE CONTROL ELEMENTS
Filed March 20, 1944

MICHEL N. YARDENY
INVENTOR

BY John P. Nilsson
ATTORNEY

Patented Feb. 15, 1949

2,462,033

UNITED STATES PATENT OFFICE 2,462,033

CONTROL APPARATUS WITH FLEXIBLE CONTROL ELEMENTS

Michel N. Yardeny, New York, N. Y.

Application March 20, 1944, Serial No. 527,232

5 Claims. (Cl. 200—6)

1

My invention relates to control apparatus and has particular reference to apparatus including independently or relatively movable control elements, one element comprising conducting means having a neutral point and another element comprising a contact member for engaging the conducting means.

My invention relates more specifically to control apparatus in which an electric motor adapted to operate a useful load is controlled by independently movable control elements, one of which is moved manually (or otherwise) to a desired position, the other having a gap or neutral point, is moved by an auxiliary motor, forming a part of the control apparatus, the load motor being stopped when the motor driven control element is moved to a position in which the gap or neutral point is engaged by the manually movable element.

Such control apparatus are described in my copending applications, Serial No. 389,162, filed April 18, 1941, now Patent No. 2,440,838, issued May 4, 1948, and Serial No. 415,544, filed October 18, 1941, now Patent No. 2,433,970, issued Jan. 6, 1948.

Apparatus of the type described are preferably equipped with means for preventing hunting or oscillations of the used drive means such as motors which may occur if a control element is displaced by inertia movements of the drive means after the control elements have reached their predetermined relative position and causes renewed operation of the drive means.

One of the objects of my present invention is to provide improved means for suppressing hunting of the drive means or motors. I have found that very goods results can be obtained by making portions of the conducting members forming one of the control elements, of a flexible resilient material and by raising these portions at the gap above a supporting insulation base. This base may have a suitable recess or depression allowing the resilient end portions of the conducting member to be deflected freely by the contact pressure between the control elements. The raised end portions of the segments may be curved downward, thus forming a seat for the contact member, so that the latter is resiliently held in the gap. The flexibility and resiliency of the end portions make it possible for the contact member to be displaced to a certain extent in relation to its seat while still bridging the gap. As a result, an overrunning of the drive means and motor by inertia, while slightly displacing the contact member does not remove the latter from the gap

2 so that the motor is rapidly brought to a final stop.

Another object of my invention is a means for counterbalancing the contact pressure between the control elements.

My invention is more fully described in the accompanying specification and drawings in which.

Figure 3:
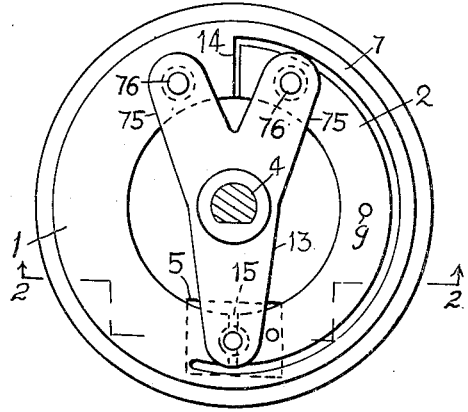
Fig. 3 is a top plan view of the same.
Figure 4:
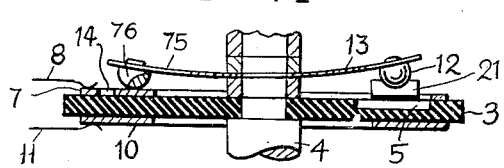
Fig. 4 is a fractional sectional view of the same taken on the line 4—4 of Fig. 3.

My control apparatus comprises a pair of segments 1, 2 made of a conducting material, preferably metal. The segments are mounted on an insulation base 3, for example in form of a disc rotatively mounted on a shaft 4. The two segments 1 and 2 have a substantially semi-circular shape as can best be seen in Fig. 3. Segment 1 has a peripheral portion extending over the entire surface of the insulation disc in the form of a narrow annular strip 7 engaged by a contact brush 8. The segment 2 is connected by rivets 9 with a ring 10 at the bottom side of the insulation disc engaged by a contact brush 11. The segments are slidably engaged by a contact ball 12 at the end of a resilient contact member or contactor 13 keyed to shaft 4, so that the contactor or contact arm and the segments are concentrically mounted.

Figure 6:
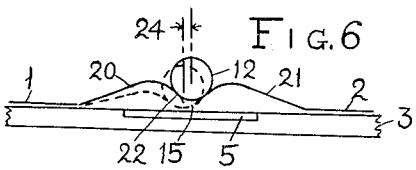
Fig. 6 is a diagrammatic detail view of control elements showing their relative displacement.

The segments are separated by gaps 14, 15, but only the gap 15 is reached or bridged by the contact member, this being the "working" gap. The end portions 20, 21 of the segments 15 are raised at the gap and curved downward at the tips 18, 19 to form a seat 22 for the ball 12. A recess or depression 5 may be provided in the disc 3 beneath the end portions 20, 21. The segments are preferably made sufficiently thin and resilient so that their end portions can yield under pressure of the contactor 13. As a result, the ball 12 if moved to a certain extent to the right or to the left will retain its contact with both segments by depressing one of the flexible end portions 20 or 21 while retaining contact with the other end portion and thereby maintaining the gap bridged. This effect is shown more clearly in Fig. 6, the relative displacement being indicated at 24. Such a limited relative displacement of the segments is usually sufficient to absorb the inertia movements of the driving means and to stop the same rapidly. Moreover, the contact member, having its ball-shaped contact point 12 wedged in the gap may be entrained by the gap while the motor is maintained inoperative or de-energized and its inertia movements are absorbed by friction.

The contact arm 13 may be provided with a forked extension having legs 75, 75 with balls 76 made of an insulating material. The balls straddle the rear gap, sliding over the segments 1, 2. Such an arrangement is useful for equalizing or counterbalancing the contact pressure between the disc and the contact arm thereby preventing distortion of the disc.

Figure 1:
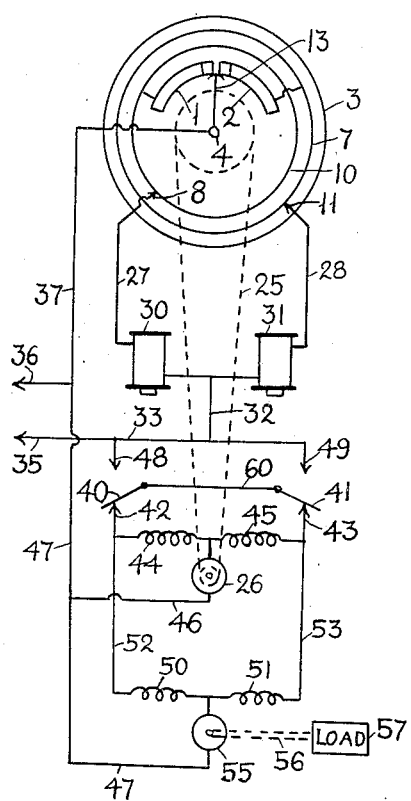
Fig. 1 is a circuit diagram of my apparatus in which series wound motors are shown by way of an example.
Figure 2:
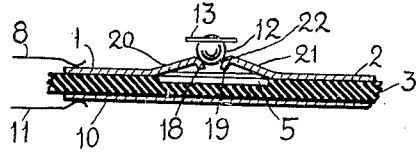
Fig. 2 is a fractional sectional view of my improved control elements taken on the line 2—2 of Fig. 3.

A circuit diagram for a control apparatus according to my invention is shown in Fig. 1. The disc 3 is connected by a suitable transmission 25 with the armature 26 of a control or auxiliary motor, the contactor 13 being adapted to be rotated manually. The segments 1, 2 are connected by leads 27, 28 with the ends of relay coils 30, 31, the other ends of the coils being connected by a common lead 32 and a lead 33 with a terminal 35 of a source of current. The other terminal 36 of the source of current is connected by a lead 37 with the contactor 13.

The relays have contact arms 40, 41 connected by a lead 60 and normally engaging contact points 42, 43 connected with the ends of reversing motor field windings 44, 45. The other ends of the windings being connected to one terminal of the armature 26, the other armature terminal is connected by leads 46, 47 with the terminal 36 of the source of current. The arms 40, 41 when attracted by the energized coils 30, 31 engage contact points 48, 49 connected to the lead 33.

A controlled or load motor having reversing windings 50, 51 is connected by leads 52, 53 with the points 42, 43, the common lead of the windings being connected with one terminal of the armature 55, the other armature terminal being connected by lead 47 with the terminal 36 of the source of current. The shaft 56 of the load motor may be connected to a useful load 57 such as a tuning element of a radio apparatus, etc.

The operation of my apparatus is as follows:

Assuming that contactor 13 is moved to the right and engages segment 2, relay 30 will be de-energized and the relay 31 energized, its circuit being closed from terminal 35 through lead 33, lead 32, coil 31, lead 28, brush 11, contact ring 7, segment 2, contactor 13 and lead 37 to terminal. Hence the relay 31 will cause the contact arm 41 to engage the point 49. Current will now flow from the terminal 35 through the lead 33, point 49, arm 41, connecting lead 60, arm 40, point 42, winding 44, armature 26 of the control motor, and leads 46, 47 to the terminal 36. The control motor will begin to rotate, causing the disc 3 to turn and the gap 15 to follow the contactor 13. Current will also flow by the lead 52 through the winding 50, armature 55 of the controlled or load motor and lead 47 to the terminal 36, causing the load or controlled motor to rotate and to operate the load. The load position may be observed directly or by means of suitable position indicating devices, such, for instance, as are disclosed in my foregoing mentioned patent applications. The manually operated contactor 13 is stopped when the desired position is approximately reached by the load while rotation of the motor continues until the gap following the contactor 15 is bridged by the ball 12 of the contactor 13. Both relay coils 30, 31 will be then energized, attracting both the arms 40, 41 thus interrupting the circuit of both motors. The motors may be provided with suitable automatic brakes such as are disclosed in my foregoing patent applications for causing the motors to stop more rapidly by absorbing the force of inertia while the gap is bridged by the ball 12 of contactor 13, thereby preventing hunting of the motors. By moving the contactor 13 slightly to the right or to the left, the load 57 may be placed exactly in a desired position.

Figure 5:
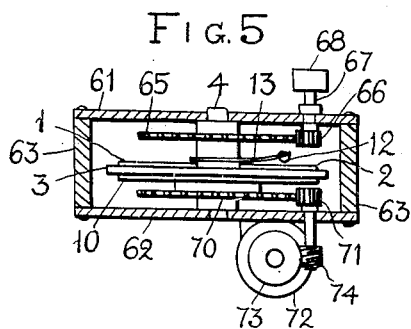
Fig. 5 is an elevational view of my control apparatus.

The control elements may be placed in a casing formed by an upper plate 61, a lower plate 62, and side walls 63, the shaft 4 being journaled into the upper and lower plates as shown in Fig. 5 and is provided with a gear 65, engaged by a pinion 66 on a shaft 67 with a knob 68 for its manual operation. The disc 3 is fastened to a gear 70 engaged by a pinion 71 operated by a motor 72 through a worm drive comprising a gear 73 and a worm 74.

It should be noted that the control motor may be operatively connected to the contactor shaft 4, the disc 3 being then connected to a manually operable shaft.

It should be also understood that the control elements may be operated in conjunction with various types of motors, A. C. or D. C. and circuit systems.

While the invention has been described in detail with respect to certain particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. Control elements for a control apparatus, one element comprising substantially semi-circular electrically conducting segments separated by a gap, and another element comprising a contact arm mounted concentrically with said segments for rotation relative to the segments and slidably engaging the said segments for causing the arm to remain in slidable engagement with at least one of the segments, while being rotated relative to the same, the end portions of the segments being resiliently flexible at the gap and arranged to yield under pressure of the contact arm when both end portions are engaged by the contact arm for retaining the latter in the gap while allowing a limited relative displacement between the two control elements.

2. Control elements for a control apparatus, one element comprising substantially semi-circular electrically conducting segments separated by a gap, and another element comprising a contact arm mounted concentrically with said segments for rotation relative to the segments and slidably engaging the said segments for causing the arm to remain in slidable engagement with at least one of the segments, while being rotated relative to the same, the segments having raised resilient end portions at the gap with downward bent tips forming a resiliently flexible seat for the contact arm.

3. Control elements for a control apparatus, one element comprising substantially semi-circular electrically conducting segments separated by a gap, and another element comprising a contact arm mounted concentrically with said segments for rotation relative to the segments and slidably engaging the said segments for causing the arm to remain in slidable engagement with at least one of the segments, while being rotated relative to the same, and an insulation base for the segments, the segments having raised resilient end portions at the gap forming a seat for the contact arm portion engaging said segments, the base having a recess positioned beneath the raised resilient end portions, said resilient portions being arranged to be yieldably depressed toward the recess by the contact arm.

4. Control elements for a control apparatus, one element comprising substantially semi-circular electrically conducting segments separated by a gap, and another element comprising a contact arm mounted concentrically with said segments for rotation relative to the segments and slidably engaging the said segments for causing the arm to remain in slidable engagement with at least one of the segments, while being rotated relative to the same, the end portions of the segments being resiliently flexible at the gap and arranged to yield under pressure of the contact arm when both end portions are engaged by the contact arm for retaining the latter in the gap while allowing a limited relative displacement between the two control elements, and balance means at the contact arm to counterbalance the contact pressure between the portions of the contact arm engaging the segments and the segments.

5. Control elements for a control apparatus, one element comprising substantially semi-circular electrically conducting segments separated by a gap, and another element comprising a contact arm mounted concentrically with said segments for rotation relative to the segments and slidably engaging the said segments for causing the arm to remain in slidable engagement with at least one of the segments, while being rotated relative to the same, the end portions of the segments being resiliently flexible at the gap and arranged to yield under pressure of the contact arm when both end portions are engaged by the contact arm for retaining the latter in the gap while allowing a limited relative displacement between the two control elements, an insulation base supporting the segments, an extension on the contact member extending the same beyond the rotary mounting thereof and arranged to engage the segments at a point substantially opposite to the point of engagement between the contact arm and the segments to counter-balance the contact pressure between the contact arm and the segments, and insulation means insulating the extended portion of the contact arm from the segments.

MICHEL N. YARDENY.

REFERENCES CITED

The following references are of record in the file of this patent:

UNITED STATES PATENTS

| Number | Name | Date |
| --- | --- | --- |
| 449,282 | Clark | Mar. 31, 1891 |
| 456,493 | Lovell | July 21, 1891 |
| 1,030,593 | Loguin | June 25, 1912 |
| 1,194,447 | Walker | Aug. 15, 1916 |
| 1,651,852 | Trenor | Dec. 6, 1927 |
| 1,715,014 | Soreng | May 28, 1929 |
| 1,725,256 | Claytor | Aug. 20, 1929 |
| 2,342,717 | Yardeny | Feb. 29, 1944 |